Nov. 8, 1932.  E. C. GLEDHILL  1,886,511
CABLE LAYING PLOW
Filed Nov. 25, 1930   4 Sheets-Sheet 1

Inventor
EDWARD C. GLEDHILL
By their Attorney
Emery, Booth, Varney & Whittemore

Nov. 8, 1932. E. C. GLEDHILL 1,886,511
CABLE LAYING PLOW
Filed Nov. 25, 1930 4 Sheets-Sheet 3

Inventor
EDWARD C. GLEDHILL
By their Attorney
Emery, Booth, Varney & Whittemore

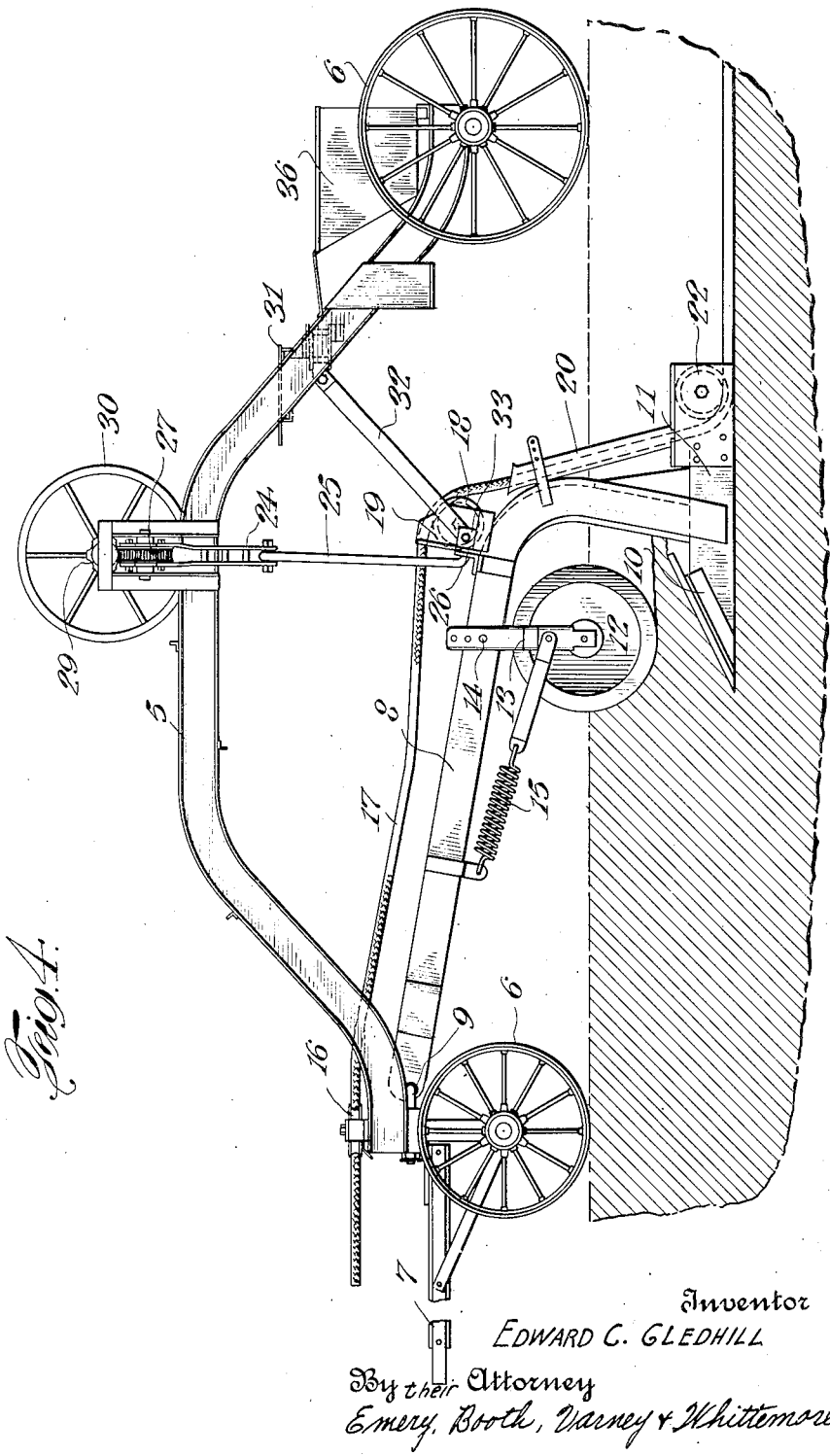

Patented Nov. 8, 1932

1,886,511

UNITED STATES PATENT OFFICE

EDWARD C. GLEDHILL, OF GALION, OHIO, ASSIGNOR TO GENERAL CABLE CORPORATION, OF NEW YORK, N. Y., A CORPORATION OF NEW JERSEY

CABLE LAYING PLOW

Application filed November 25, 1930. Serial No. 498,002.

This invention relates to cable laying machines and an object of the invention is to provide a machine for laying underground cable, constructed and arranged to form a trench and lay the cable therein, the walls of the trench closing in over the cable so that the latter is completely buried without the necessity of any manual digging or refilling operations.

This and other objects which will be apparent to those skilled in this particular art are accomplished by means of the invention illustrated in the accompanying drawings in which—

Fig. 4 is a side elevation thereof.

Figure 1:
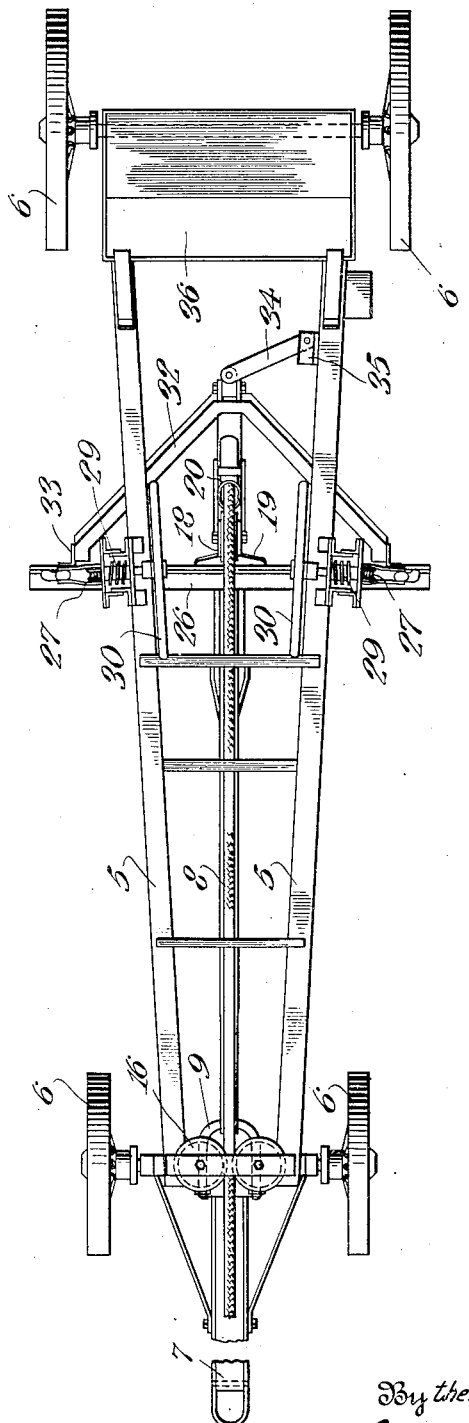
Fig. 1 is a top plan view of a cable laying machine constructed in accordance with one embodiment of this invention.
Figure 2:
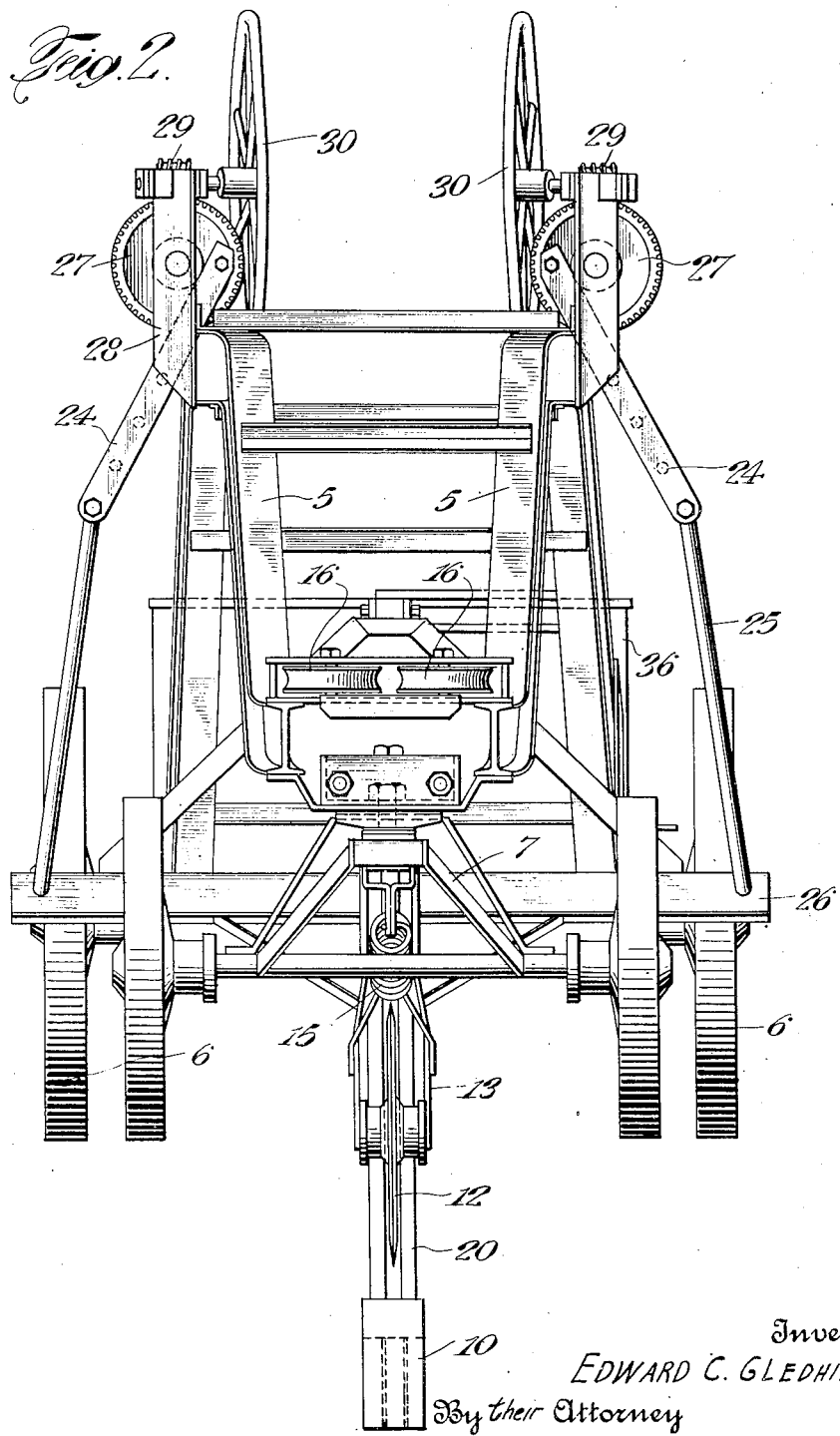
Fig. 2 is a front elevation of the machine shown in Fig. 1.

The cable laying machine which has been chosen for the purposes of illustration is arranged to operate in connection with a cable which has previously been laid along the surface of the ground, approximately on the line along which it is to be buried, in a manner generally similar to that disclosed in the co-pending application of Roger N. Murphy, Serial No. 492,697, filed November 1, 1930. Like the machine of the Murphy application, the present machine is provided with a suitable trench or furrow forming device which cuts the desired furrow as the machine is drawn along the predetermined path. Means is provided for picking up the cable and depositing it in the furrow in the rear of the cutting or plowing mechanism, and the formation of the furrow is such that the walls thereof close in over the cable as the machine is drawn along.

In the drawings, the machine comprises arched frame members 5 which are mounted upon wheels 6 and associated with a suitable hitching device 7 by which the machine can be attached to a tractor or any means of locomotion. A plow beam 8 is pivoted to the front of the carriage upon a suitable supporting bolt 9 or the like for vertical swinging movement. The rear end of the plow beam 8 is curved downwardly and provided with a suitable trench forming mechanism including a plowshare 10 positioned on a longitudinally extending member 11, see Fig. 4, connected to the lower end of the beam. A colter wheel 12 is mounted in brackets 13 adjustably connected to the plow beam to permit varying the position of the colter with respect thereto. The brackets 13 are pivotally supported by a pin 14 which permits the colter to swing rearwardly and pass over any solid obstruction, a spring 15 yieldingly holding the colter in normal position.

Figure 3:
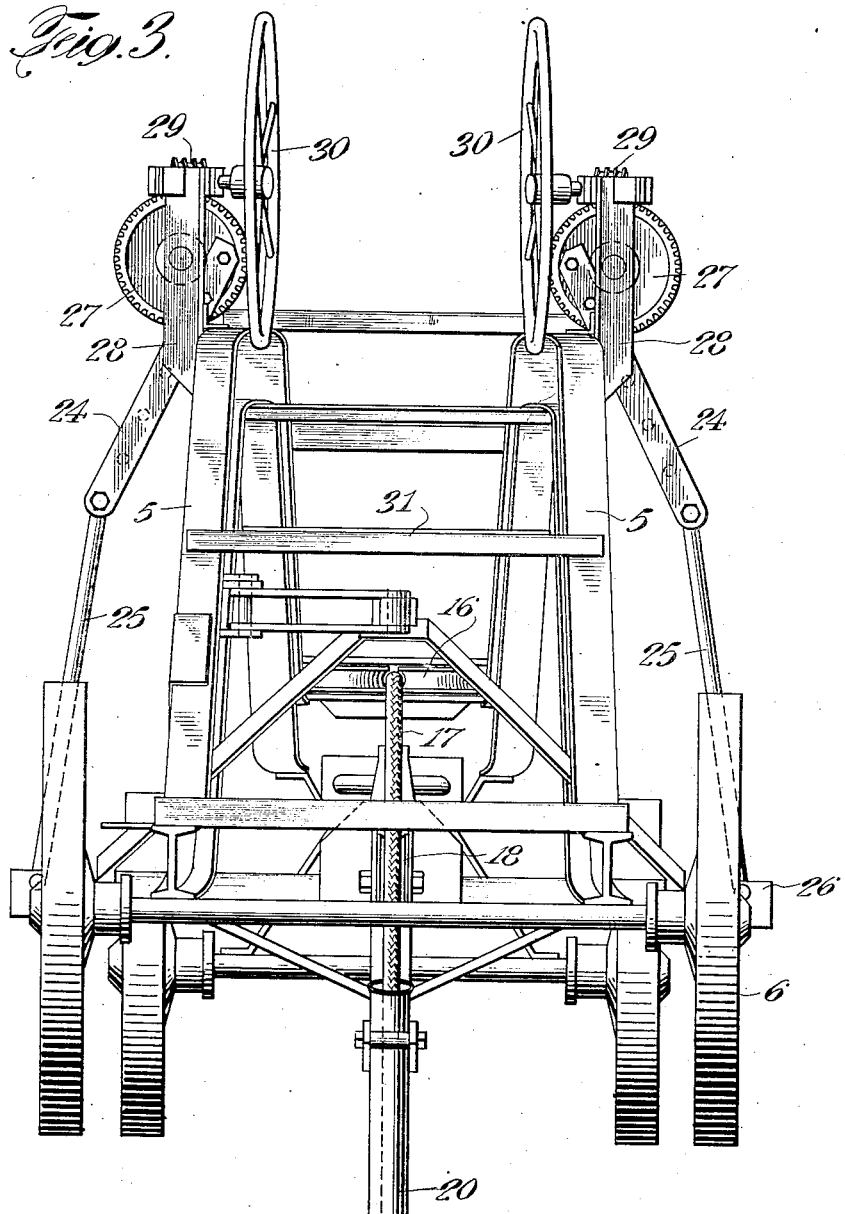
Fig. 3 is a rear elevation.

At the front of the carriage is a suitable cable pick-up mechanism which includes a pair of horizontally disposed pick-up rollers 16 positioned so as to properly pass the cable rearwardly after lifting it from the ground on either side of the machine. From the pick-up rollers 16, the cable 17 passes rearwardly over a guide roller 18 mounted between brackets 19 on the rear of the plow beam 8 above the plowshare, and thence downwardly through a guiding and protecting conduit or sleeve 20 secured to the rear of the beam and communicating with a substantially closed chamber 21 in which a cable laying roller 22 is positioned at the rear of the plowshare supporting member 11, the chamber having an opening 23, see Fig. 3, to permit the cable to pass outwardly and lie in the trench or furrow formed by the plow.

It will be apparent that variation of the vertical position of the beam 8 and furrow forming mechanism will vary the depth of trench and correspondingly vary the depth at which the cable 17 is laid. Suitable mechanism is formed for adjusting the height of the beam 8 and for locking it in adjusted position, to permit the cable 17 to be laid at any practical depth desired. As illustrated, a pair of operating levers 24 are connected by links 25 with opposite ends of a cross bar 26 formed by an angle iron secured to the plow beam 8 at the rear thereof. Each operating lever is secured to a worm wheel 27 mounted in suitable brackets 28 on the top of the frame members 5 and rotated by worms 29 each of which is driven by a hand-wheel 30 accessible to an operator standing on a suitable platform 31 on the frame 5.

The plow beam 8 is centered and any lateral movement thereof is resisted by a more or less V-shaped yoke 32 having its arms pivoted to brackets 33 secured to the cross bar 26, and the center of the yoke pivoted to one end of a link 34 having its opposite end pivoted in supporting brackets 35 mounted on one of the frame members 5. This arrangement centers the beam and prevents any lateral movement thereof relative to the carriage while at the same time permitting the vertical adjustment thereof.

The rear of the carriage is provided with a container or the like 36 to receive a variable amount of ballast, the amount of which will depend largely upon soil conditions, certain soils requiring considerably more weight to produce the desired depth of furrow than others. At the same time, the tires of the rear wheels 6 are of sufficient width to resist the tendency of the plow point 10 to draw down deeper into some forms of soil.

In operation, assuming a length of cable has been laid along the ground on substantially the path that it is to follow when laid underground, the machine is drawn along such path by any suitable means. The pick-up mechanism, illustrated as in the form of the horizontally disposed rollers 16, lifts the cable from the ground as the machine is drawn along and passes it rearwardly to the guide rollers 18 from which it passes downwardly through the guard sleeve 20 and around the bottom of the cable laying roller 22 which positions it in the bottom of the trench or furrow formed by the plow. The sleeve 20 and walls of the chamber 21 in which the cable laying roller 22 is positioned, prevent the soil from injuring or abrading the surface of the cable and the latter is protected from any contact with the soil, rocks or the like until it is definitely positioned and laid in the bottom of the trench. The colter 12 and plow share 10 operate in the usual way to produce a suitable furrow and the design of the plow mechanism is such that the walls of the furrow close together under the influence of gravity after the machine has passed so that no refilling operation or the like is necessary to cover the cable.

Although I have described a specific form of this invention in more or less detail, it will be apparent that various additions, omissions and substitutions can be made therein without departing from the spirit of this invention or the scope of the appended claims.

What I claim as new and desire to secure by Letters Patent is:—

1. In combination, a furrow forming plow, means for adjusting the depth of operation of said plow, and means for depositing within the furrow formed thereby a length of cable previously laid along the ground including a pair of cable pick-up rollers and means for directing the cable from said rollers into said furrow.

2. In combination, a furrow forming plow, means for adjusting the depth of operation of said plow, and means for depositing within the furrow formed thereby a length of cable previously laid along the ground including a pair of horizontally disposed cable pick-up rollers and means for directing the cable from said rollers into said furrow.

3. The combination in a cable laying machine of a vertically adjustable longitudinally extending plow beam pivotally supported thereon at its forward end, a plowshare on the movable end of said beam, a colter supported on said beam, means for laying a cable in the furrow formed by said share, cable pick-up mechanism located adjacent the front end of said beam for directing a cable previously laid along the ground rearwardly of said beam to said cable laying means and manually operated mechanism including a worm and gear for raising and lowering said plow beam and for locking said beam in adjusted position.

4. The combination in a cable laying machine of a vertically movable plow beam provided with a plowshare and means for laying a cable in the furrow formed by said share, a cross bar secured to said plow beam, operating levers linked to said cross bar, and means for manually operating said levers to raise and lower said beam.

5. The combination in a cable laying machine of a vertically movable plow beam provided with a plowshare and means for laying a cable in the furrow formed by said share, a cross bar secured to said beam, operating levers linked to said cross bar, means for manually operating said levers to raise and lower said beam, and a plow beam guiding yoke connected to said cross bar and pivoted to said machine to resist lateral movement of said beam relatively to said machine.

In testimony whereof, I have signed my name to this specification this 20th day of November, 1930.

EDWARD C. GLEDHILL.